United States Patent
Rysdyk et al.

(10) Patent No.: US 12,077,293 B2
(45) Date of Patent: Sep. 3, 2024

(54) METHODS AND APPARATUS TO GUIDE AN UNMANNED AERIAL VEHICLE FOR RECOVERY THEREOF

(71) Applicant: Insitu, Inc., Bingen, WA (US)

(72) Inventors: Rolf Rysdyk, Bingen, WA (US); Mohammad Ehsan Nasroullahi, Beaverton, OR (US)

(73) Assignee: Insitu, Inc., Bingen, WA (US)

( * ) Notice: Subject to any disclaimer, the term of this patent is extended or adjusted under 35 U.S.C. 154(b) by 62 days.

(21) Appl. No.: 17/477,251

(22) Filed: Sep. 16, 2021

(65) Prior Publication Data

US 2023/0085101 A1  Mar. 16, 2023

(51) Int. Cl.
*B64C 39/02* (2023.01)
*B64F 1/02* (2006.01)
*B64U 70/30* (2023.01)
*G05D 1/00* (2006.01)

(52) U.S. Cl.
CPC .......... *B64C 39/022* (2013.01); *B64C 39/024* (2013.01); *B64F 1/029* (2020.01); *B64U 70/30* (2023.01); *G05D 1/101* (2013.01)

(58) Field of Classification Search
None
See application file for complete search history.

(56) References Cited

U.S. PATENT DOCUMENTS

| | | | |
|---|---|---|---|
| 11,521,357 B1* | 12/2022 | Côté | G06T 17/00 |
| 2015/0241198 A1* | 8/2015 | Limvorapun | B64D 1/22 |
| | | | 702/151 |
| 2018/0072418 A1* | 3/2018 | Shannon | B64C 39/024 |
| 2018/0072419 A1* | 3/2018 | Burgess | G05D 1/042 |
| 2020/0148387 A1* | 5/2020 | Johansen | B64F 1/02 |
| 2021/0171216 A1 | 6/2021 | Brown et al. | |
| 2021/0197970 A1* | 7/2021 | Azeredo | B66C 1/40 |

FOREIGN PATENT DOCUMENTS

| | | | | |
|---|---|---|---|---|
| DE | 102018128970 | | 5/2020 | |
| EP | 3656671 A1 * | | 5/2020 | B64C 39/00 |

OTHER PUBLICATIONS

European Patent Office, "Extended European Search Report", issued in connection with European Patent Application No. 22183658.8 on Dec. 14, 2022, 11 pages.

* cited by examiner

*Primary Examiner* — Tuan C To
*Assistant Examiner* — David Ruben Pedersen
(74) *Attorney, Agent, or Firm* — HANLEY, FLIGHT & ZIMMERMAN, LLC

(57) ABSTRACT

Methods and apparatus to guide an unmanned aerial vehicle for recovery thereof are disclosed. A disclosed example apparatus includes a sensor at or proximate a tether line, the sensor to measure at least one parameter of an aircraft while the aircraft is in flight and provide sensor output corresponding to a position of the aircraft, and a transceiver to transmit data corresponding to the position to the aircraft for guiding the aircraft to engage the tether line for recovery of the aircraft or a payload carried by the aircraft.

22 Claims, 10 Drawing Sheets

METHODS AND APPARATUS TO GUIDE AN UNMANNED AERIAL VEHICLE FOR RECOVERY THEREOF

FIELD OF THE DISCLOSURE

This disclosure relates generally to aircraft and, more particularly, to methods and apparatus to guide an unmanned aerial vehicle for recovery thereof.

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus includes a sensor at or proximate a tether line, the sensor to measure at least one parameter of an aircraft while the aircraft is in flight and provide sensor output corresponding to a position of the aircraft, and a transceiver to transmit data corresponding to the position to the aircraft to guide the aircraft to engage the tether line for recovery of the aircraft or a payload carried by the aircraft.

An example method of guiding an aircraft includes measuring, via a sensor positioned at or proximate a tether line, a position of the aircraft while the aircraft is in flight, and transmitting, via a transceiver, data pertaining to the measured position to the aircraft to guide the aircraft to engage the tether line for recovery of the aircraft or a payload carried by the aircraft.

An example non-transitory computer readable medium includes instructions, which when executed, cause at least one processor to calculate a position of an aircraft relative to a tether line or a device supporting the tether line based on sensor output from a sensor positioned at or proximate the tether line while the aircraft is in flight, calculate an adjustment of movement of the aircraft based on the calculated position, and guide the aircraft to engage the tether line by causing a transceiver to transmit data pertaining to the calculated adjustment to the aircraft.

An example system includes a tether line, the tether line to be suspended for recovery of an aircraft, a sensor having a sight line to an area proximate the tether line, the sensor to detect the aircraft and output signals corresponding to a position of the aircraft, and a transceiver to transmit data pertaining to the position of the aircraft to the aircraft for guidance of the aircraft so that the aircraft engages the tether line.

Figure 1:
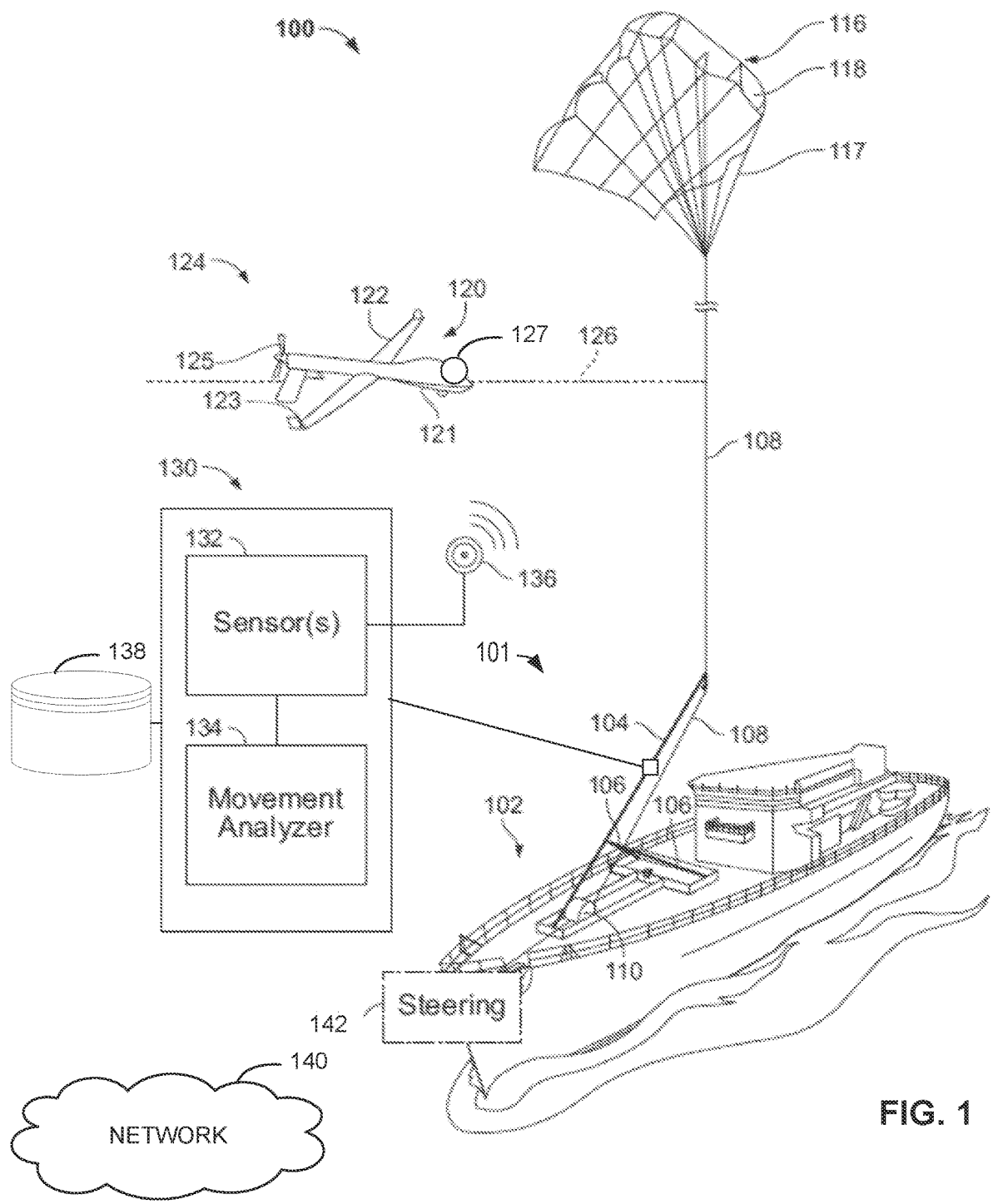
FIGS. 1 and 2 depict example unmanned aerial vehicle (UAV) recovery systems in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication." including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus to guide an unmanned aerial vehicle (UAV) for recovery thereof are disclosed. Some UAVs are recovered by recovery systems, which employ a recovery tether line that is suspended vertically. In particular, a UAV contacts and/or impacts the tether line and, as a result, the UAV is decelerated and/or stopped from flight, thereby enabling recovery of the UAV without need for a runway. However, it can be difficult to guide the UAV to contact the tether line based on movement of the tether line and/or a structure on which the tether line is suspended (e.g., the tether line is suspended from a ship that is rocking based on wave movements). In some known implementations, the tether line is suspended by a kite, which can also be subject to significant movement and/or displacement in a relatively short amount of time. As a result, guiding the UAV to contact the tether line can be challenging.

Examples disclosed herein enable accurate guidance of an aircraft so that the aircraft or a payload carried by the aircraft can be recovered by a tether line, thereby avoiding potential additional landing passes/attempts and, thus, conserving fuel and preventing excess mission time. Further, examples disclosed herein can accurately guide the aircraft in windy conditions or when the tether line is moving (e.g., due to movement of a vessel and/or kite supporting the tether line). Examples disclosed herein can also enable recovery of the aircraft when a recovery vessel (e.g., a ship) and/or a device supporting the tether line (e.g., a kite) is encountering significant movements and/or shifts (e.g., due to waves, wind conditions, etc.).

An example apparatus for recovering an aircraft (e.g., a UAV) includes a sensor on or proximate a tether line to which the aircraft is to engage for recovery thereof. However, in some examples, the aircraft engages the tether line for recovery of a payload carried by the aircraft. The example sensor provides (e.g., outputs) a sensor output (e.g., a sensor output signal) corresponding to a measured parameter of the aircraft, such as a relative position of the aircraft to the tether line and/or a device (e.g., a boom, a kite, etc.) supporting the tether line. The example apparatus also includes a transceiver and/or transmitter to transmit data corresponding to the sensor output to the aircraft to guide the aircraft toward the tether line so that the aircraft contacts and/or engages the tether line. The apparatus and/or the aircraft can also include at least one memory stored therein and a processor to execute instructions to calculate a trajectory/course or characterize movement of the aircraft and determine an adjustment of movement of the aircraft based on the sensor output, the trajectory and/or the characterized movement of the aircraft. The transmitted data may include the adjustment of the movement of the aircraft (e.g., as guidance data).

In some examples, the data transmitted to the aircraft includes the sensor output. The sensor output can include global positioning system (GPS) data and/or differential GPS data. In some examples, the sensor is mounted to and/or carried by the tether line. In some examples, an additional sensor is utilized to measure at least a portion of the tether line for guidance of the aircraft. In some such examples, the processor develops a spatial arrangement (e.g., a 3D model) of the tether line. In some examples, the data includes a relative position of the aircraft to the tether line and/or a device or structure supporting the tether line. In some examples, the data, which may include guidance data, is transmitted to the aircraft in substantially real time for relatively quick adjustments to the movement of the aircraft.

FIG. 1 depicts an example UAV recovery system 100 in accordance with teachings of this disclosure. The UAV recovery system 100 of the illustrated example is implemented on a vessel 101 and includes a tether line control mount 102, which includes a boom (e.g., a lower tether boom, a rotatable boom, a swivel boom, a pivoting boom, etc.) 104 and boom supports 106. In the illustrated example, a tether line 108 extends from the tether line control mount 102 while a tensioner or tension device 110, which is implemented as a winch in this example, is operatively coupled to the tether line 108. In some examples, the tether line 108 is suspended and/or supported by a kite 116 which, in turn, includes support lines (e.g., kite lines, foil lines, etc.) 117 and a foil (e.g., a lift foil, a lift generation foil, a kite body) 118. However, the tether line 108 can be implemented by any other structure or device. The UAV recovery system 100 of the illustrated example is implemented to capture an aircraft 120, which is a UAV in this example. In other examples, the aircraft 120 may be implemented as another type of aircraft (e.g., a manned aircraft), spacecraft, etc.

The example UAV 120 includes a fuselage 121, wings 122 each of which includes a distal capture portion 123, and a propulsion system 124 with propellers 125. In this example, the distal capture portion 123 extends from at least one of the corresponding wings 122 generally along a direction of movement of the UAV 120. However, any appropriate type of capture or recovery mechanism can, instead, be implemented on any other portion and/or component (e.g., the fuselage 121) of the UAV 120. Further, any other appropriate type of propulsion of the UAV 120 can, instead, be implemented. The example UAV 120 moves along a flight path 126 and also includes a guidance controller 127.

In this example, the UAV recovery system 100 includes a guidance apparatus (e.g., a guidance device, a guidance sensor device, etc.) 130 to guide movement of the UAV 120 toward the tether line 108 so that the UAV 120 engages (e.g., contacts) the tether line 108. The guidance apparatus 130 of the illustrated example includes at least one sensor 132 and a transceiver (e.g., a transmitter) 136 communicatively coupled to the UAV 120 and/or the guidance controller 127. In this example, the at least one sensor 132 is located on, proximate or along a sight line of an area proximate the tether line 108. In some examples, the guidance apparatus 130 includes a movement analyzer 134. Additionally or alternatively, the guidance apparatus 130 also includes a storage (e.g., a data storage) 138. In some examples, the guidance apparatus 130 is communicatively coupled to a network 140 (e.g., via the transceiver 136).

To recover and/or capture the UAV 120 as the UAV 120 moves along the aforementioned flight path 126, movement of the UAV 120 is guided and/or directed by the example guidance apparatus 130 based on sensor output from at least one of the sensors 132. In particular, the example sensor 132 measures a position, a speed, an orientation, a trajectory and/or a course of the UAV 120 and, in turn, sensor output from the sensor 120 is utilized to guide the UAV 120 toward the tether line 108 so that the distal capture portion 123 can be brought in contact with the tether line 108, thereby enabling the tether line 108 to suspend the UAV 120. In this example, the UAV 120 receives data (e.g., relative position data, guidance data, tether line movement data, etc.) corresponding to the sensor output via the transceiver 136. In other words, the transceiver 136 transmits the data corresponding to the detected position, speed, orientation, trajectory and/or course of the UAV 120 to the UAV 120. The data can correspond to an absolute position (e.g., in global spatial coordinates) and/or a relative position of the UAV 120 to the tether line 108 and/or the vessel 101 so that the UAV 120 can be directed toward the tether line 108. The relative position of the UAV 120 to the tether line 108 or the vessel 101 may be based on differential GPS signals. In some examples, the data includes a calculated or determined adjustment (e.g., corresponding to a course and/or trajectory of the UAV 120) that is provided to the UAV 120 so that the guidance controller 127 can adjust the movement of the UAV 120 toward the tether line 108. Additionally or alternatively, the calculated adjustment includes an adjustment of a speed and/or a throttle setting of the UAV 120.

In some examples, a position, orientation, configuration and/or spatial arrangement of the tether line 108 may be calculated for guidance of the aircraft to the tether line 108. In some such examples, at least one of the sensors 132 measures and/or determines a position of at least a portion of the tether line 108 (e.g., a relative position of the at least the portion of the tether line 108 to the UAV 120). In turn, the position is used in guiding the UAV 120 toward the tether line 108 (e.g., as positional data, as trajectory adjustment data, etc.). Additionally alternatively, a spatial model of the tether line 108 is utilized. The spatial model can be a 3-D representation (e.g., based on polygons and/or line/volume segments, etc.). In some examples, the sensor 132 is utilized to detect a position of the kite 116 for determination of the position and/or spatial arrangement of the tether line 108. In some examples, a displacement of the tether line 108 (e.g., due to wind conditions) is measured by the sensor 132 for guidance of the UAV 120.

In some examples, the example movement analyzer 134 calculates an adjustment of the movement of the UAV 120, the flight path 126 and/or a course of the UAV 120 so that the UAV 120 (e.g., the capture portion 123 of the UAV 120) engages and/or is brought into contact with the tether line 108. In particular, the movement analyzer 134 of the illustrated example may cause the transceiver 136 to transmit data pertaining to the adjustment of movement of the UAV 120 to the guidance controller 127 of the UAV 120. In other words, guidance adjustment data can be transmitted to the guidance controller 127 as signals (e.g., guidance signals) transmitted to the UAV 120 to cause movement of the UAV 120 toward the tether line 108. In some examples, guidance data and/or information of the UAV 120 is stored in the storage 138.

In some examples, an environmental condition proximate the tether line 108 is determined for guidance of the UAV 120. In some examples, the effect of the environmental condition on a position of the tether line 108 is determined and/or predicted. The environmental condition can include, but is not limited to, wind magnitude and direction, rain, waves, water conditions affecting the vessel 101, air temperature, water temperature, wind direction, etc. In such examples, the adjustment of the movement of the UAV 120 can be based on the determined environmental condition.

In some examples, the tensioner 110 maintains a tension of the tether line 108 extending between the tether line control mount 102 and the kite 116 within a threshold range and/or at a nominal tension value (e.g., to facilitate capture of the UAV 120). In some examples, the kite 116 is steered to direct the tether line 108 within a requisite range of the aforementioned flight path 126. In some examples, a steering device 142 is implemented to direct lateral and/or translation movement of the tether line control mount 102 and/or the kite 116. For example, the steering device 142 is controlled based on sensor output from the sensor 132.

The sensor 132 can be an optical sensor, a camera, a positional tracking sensor, a Radio Detection and Ranging (RADAR) sensor, a Light Detection and Ranging (LIDAR) sensor, etc. However, any other appropriate sensor type can be implemented.

While the example of FIG. 1 is shown in the context of the vessel 101, examples disclosed herein can be applied to any stationary or moving support structure (e.g., a vehicle). Accordingly, examples disclosed herein can be applied to any appropriate moving platform, vehicle and/or aircraft. In contrast, FIG. 2 described below depicts an example stationary structure for supporting the tether line 108.

Figure 2:
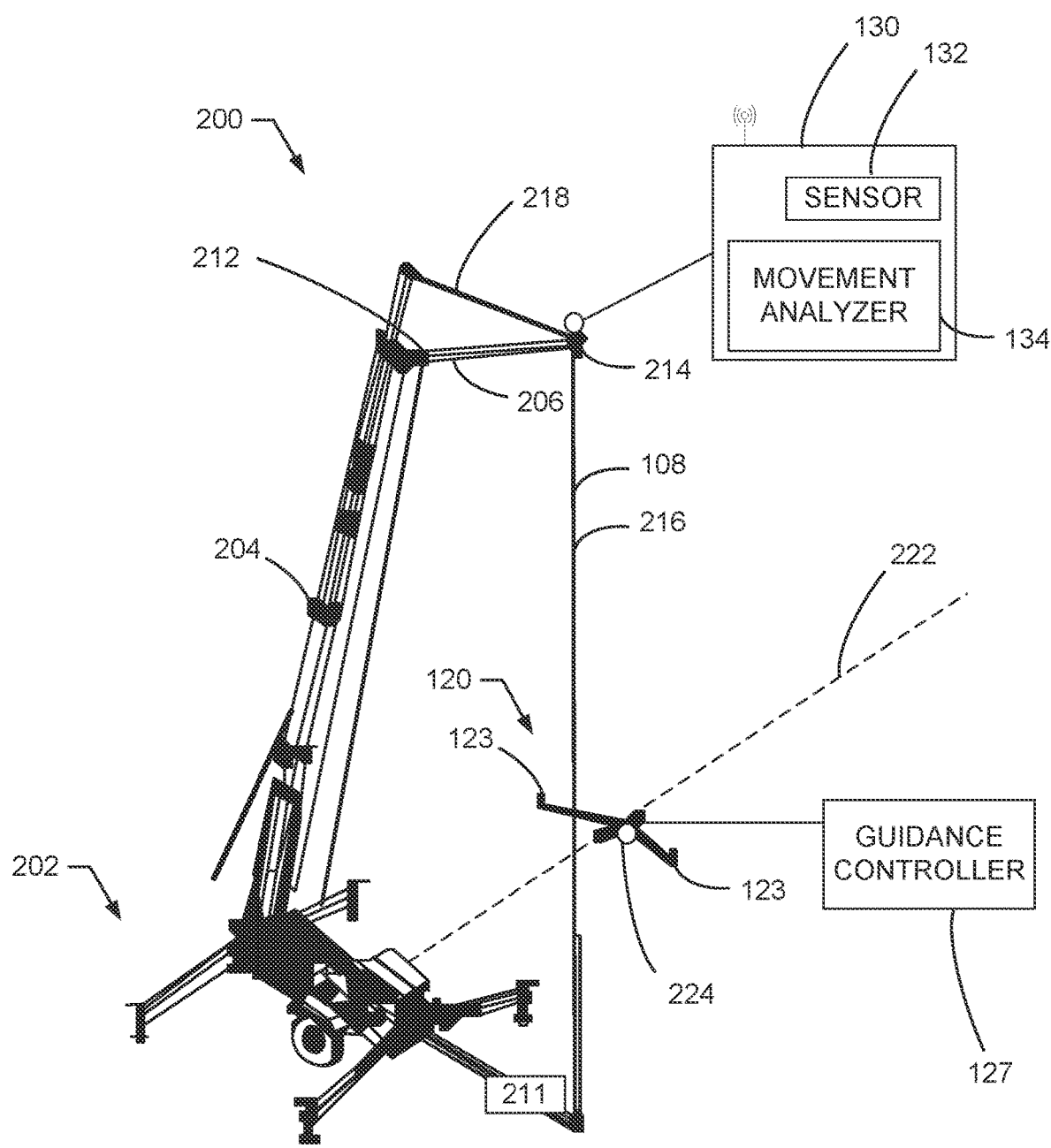

Turning to FIG. 2, an example implementation similar to that of FIG. 1 is shown but, instead, a relatively stationary structure is utilized for recovery of the UAV 120. In the illustrated example of FIG. 2, a UAV recovery system 200 includes a base 202, a mast 204, a boom 206, and the tether line 108. The example tether line 108 is operatively coupled to a tensioner 211. In this example, the boom 106 includes a first end (e.g., a proximal end) 212 at the mast 104 and a second end (e.g., a distal end) 214 of the boom 106 that is opposite the first end 212. The tether line 108 of the illustrated example extends from the mast 204 to the base 202, and is guided by the boom 206. Further, a first portion 216 of the tether line 108 extends from the base 202 and/or the ground associated with the base 202 to the second end 214 for contact with the UAV 120 while a second portion 218 of the tether line 108 extends between the second end 214 and the mast 204 to constrain/guide the tether line 108.

To recover and/or capture the UAV 120 as the UAV 120 moves along a flight path 222, one of the distal capture portions 123 is brought into contact with the first portion 216 of the tether line 108. As a result, the UAV 120 is decelerated. In turn, the UAV 120 is brought to a rest and remains attached to the tether line 108. In this example, the tether line 108 is suspended to support the tether line 108 in the air (e.g., substantially vertically in the air, within 5 degrees from vertical). In some other examples, a payload 224 is recovered from the UAV 120 when the UAV 120 is guided toward the tether line 108. The payload 224 can be removed from the UAV 120.

To guide the UAV 120 toward the tether line 108 and/or the first portion 216, the sensor 132 of the guidance apparatus 130 detects and/or measures at least one parameter of the UAV 120. In turn, sensor output of the sensor 132 and/or data pertaining to the sensor output is transmitted to the UAV 120 and utilized by the UAV 120 to guide movement thereof. In particular, the guidance controller 127 and/or the movement analyzer 134 can utilize data corresponding to a position of the UAV 120 relative to the tether line 108 to guide the UAV 120 to contact and engage the tether line 108. In some examples, the movement analyzer 134 of the guidance apparatus 130 determines and/or calculates a position, course and/or speed of the UAV 120 relative to the tether line 108 and provides guidance data to the UAV 120. Additionally or alternatively, a heading of the UAV 120 is determined. In some examples, differential GPS signals transmitted from the guidance apparatus 130 are received by the UAV 120 and utilized to adjust a movement of the UAV 120.

In some examples, the tensioner 211 maintains a tension of the tether line 108 within a threshold range and/or at a nominal tension value (e.g., a tension value to facilitate capture of the UAV 120). Additionally or alternatively, the tether line 108 is steered within a requisite range of the aforementioned flight path 222 for capture of the UAV 120.

Figure 3:
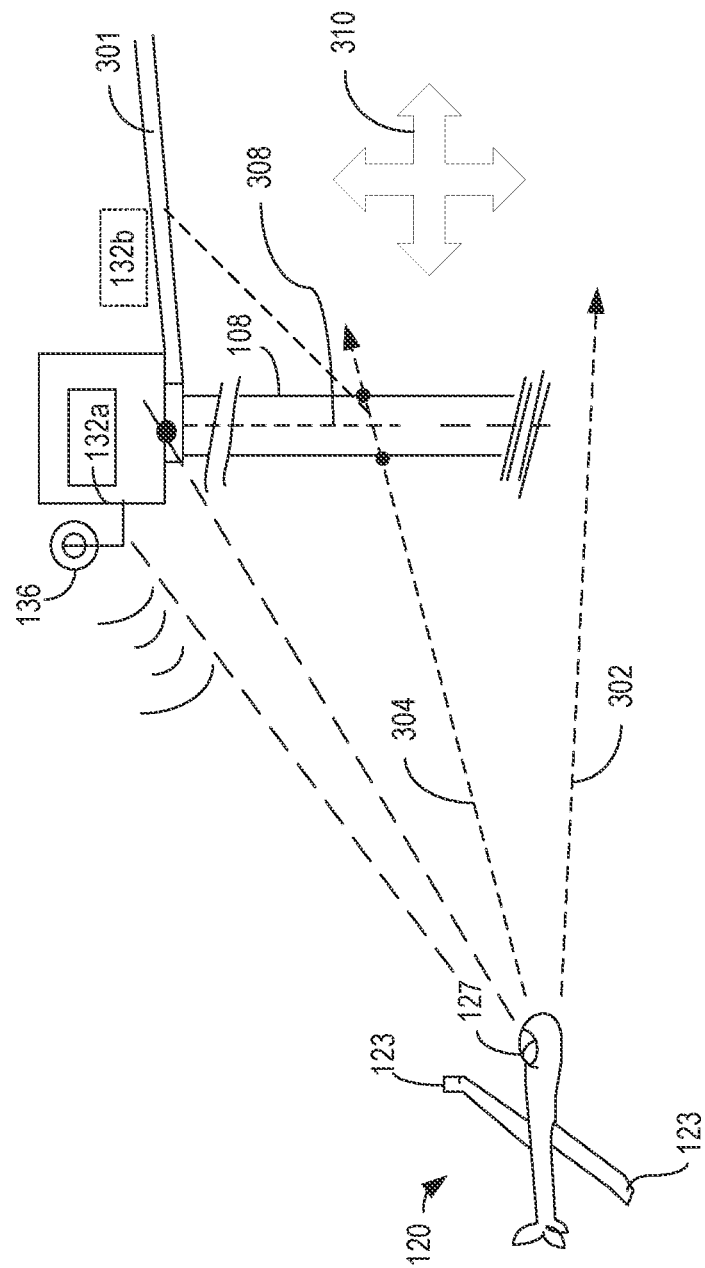
FIG. 3 illustrates example aircraft guidance in accordance with teachings of this disclosure.

FIG. 3 illustrates example aircraft guidance in accordance with teachings of this disclosure. In this example, the UAV 120 is depicted flying in a direction toward a vicinity or area of the tether line 108, which is supported and held in tension by a beam 301. In the view of FIG. 3, the example UAV 120 is shown travelling along a travel path 302 that does not intersect the tether line 108 at a given time and/or is not predicted to intersect the tether line 108 based on the current course and/or trajectory of the UAV 120. In contrast, a travel path 304 is predicted to enable the distal portion 123 of the UAV 120 to contact the tether line 108. In the illustrated example, the sensor 132a is positioned at or proximate the tether line 108 to measure at least one parameter of the UAV 120.

To adjust movement of the UAV 120 by transitioning the UAV 120 from the travel path 302 to the travel path 304, the sensor 132a determines a position of the UAV 120 relative to the tether line 108. In turn, the relative position is utilized by the guidance apparatus 130 and/or the guidance controller 127 to direct an adjustment in movement of the UAV 120 so that the UAV 120 contacts the tether line 108 despite movement of the tether line 108 and/or a vessel/vehicle supporting the tether line 108. Accordingly, examples disclosed herein can advantageously account for movement of the tether line 108, as generally indicated by arrows 310, during guidance of the UAV 120. In some examples, the sensor 132a is aligned with a center line 308 of the tether line 108 while the tether line 108 is held in tension to facilitate capture of the UAV 120. In other words, a known relative positioning of the tether line 108 to the sensor 132a can be utilized in determining a relative position of the UAV 120. Further, at least one of the sensors 132a, 132b may be placed on a separate vessel or aircraft from that supporting the tether line 108.

In some examples, the additional sensor 132b measures a position, displacement and/or movement of the tether line 108. In this example, the tether line 108 is held in tension by the boom 301 and a position and/or spatial arrangement of the tether line 108 relative to the UAV 120 is measured (in 3D space) by the sensor 132b to facilitate guidance of the UAV 120 so that the distal contact portion 123 contacts the tether line 108. In some examples, a sway (e.g., a periodic sway) and curvature of the tether line 108 measured by the sensor 132b is taken into account when guiding the UAV 120 toward the tether line 108.

While the travel paths 302, 304 appear generally straight in the view of FIG. 3, the travel paths 302, 304 may, instead, be curved, parabolic and/or arcuate. While two of sensors 132 are shown in this example, any appropriate number of the sensors 132 can be implemented instead (e.g., one, three, five, ten, twenty, etc.).

Figure 4A:
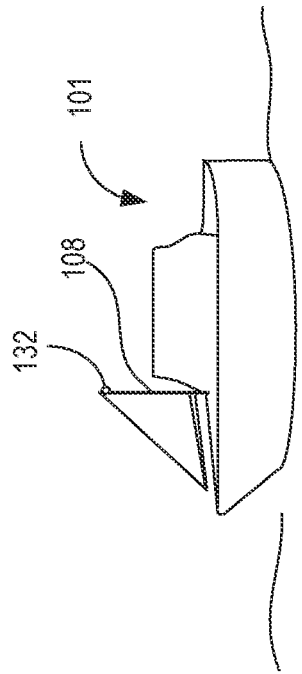
FIGS. 4A-4D depict alternative example sensor implementations that can be implemented in examples disclosed herein.

FIGS. 4A-4D depict alternative example sensor implementations that can be implemented in examples disclosed herein. Turning to FIG. 4A, the vessel 101 is shown supporting the tether line 108 with at least one of the sensors 132 mounted on an upper portion of the vessel 101. Additionally or alternatively, the sensor 132 is mounted to a deck or hull of the vessel 101.

Figure 4B:
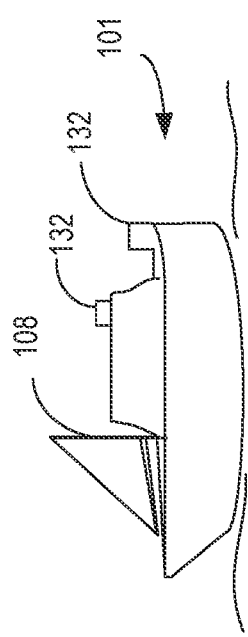

FIG. 4B depicts the sensor 132 mounted to the tether line 108 supported by the vessel 101. In some examples, the sensor 132 hangs from or is suspended from (e.g., is mounted to) the tether line 108. Additionally or alternatively, the sensor 132 is positioned at an intermediate length (e.g., at a halfway point in height from ground/sea level) of the tether line 108.

Figure 4C:
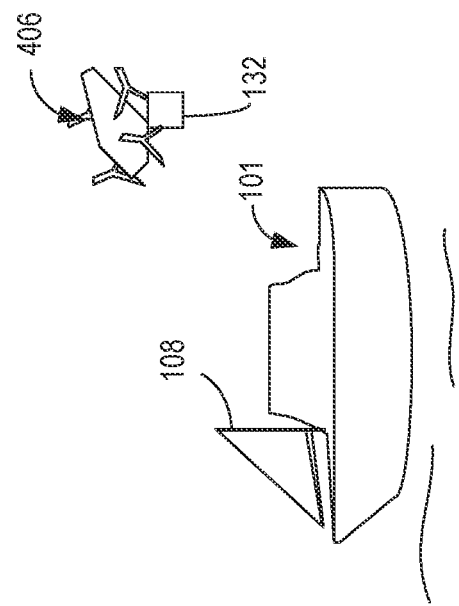

Turning to FIG. 4C, the sensor 132 is shown mounted to a separate vessel 404 from the vessel 101 supporting the tether line 108. In the illustrated example of FIG. 4C, the sensor 132 is oriented and/or positioned to have a sight line to an area surrounding the tether line 108.

Figure 4D:
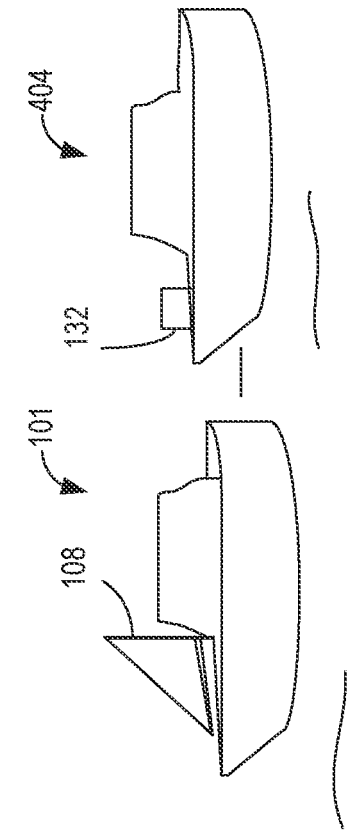

FIG. 4D depicts a drone or UAV 406 carrying the sensor 132. In this example, the UAV 406 is hovering near the vessel 101 supporting the tether line 108. In this example, the UAV 406 maintains a line of sight of the sensor 132 toward the vessel 101 and/or an area proximate (e.g., surrounding) the tether line 108. Additionally or alternatively, the UAV 406 remains (e.g., hovers proximate the tether line 108 and/or an area near the tether line 108 so that the sensor 132 is positioned proximate the tether line 108.

Figure 5:
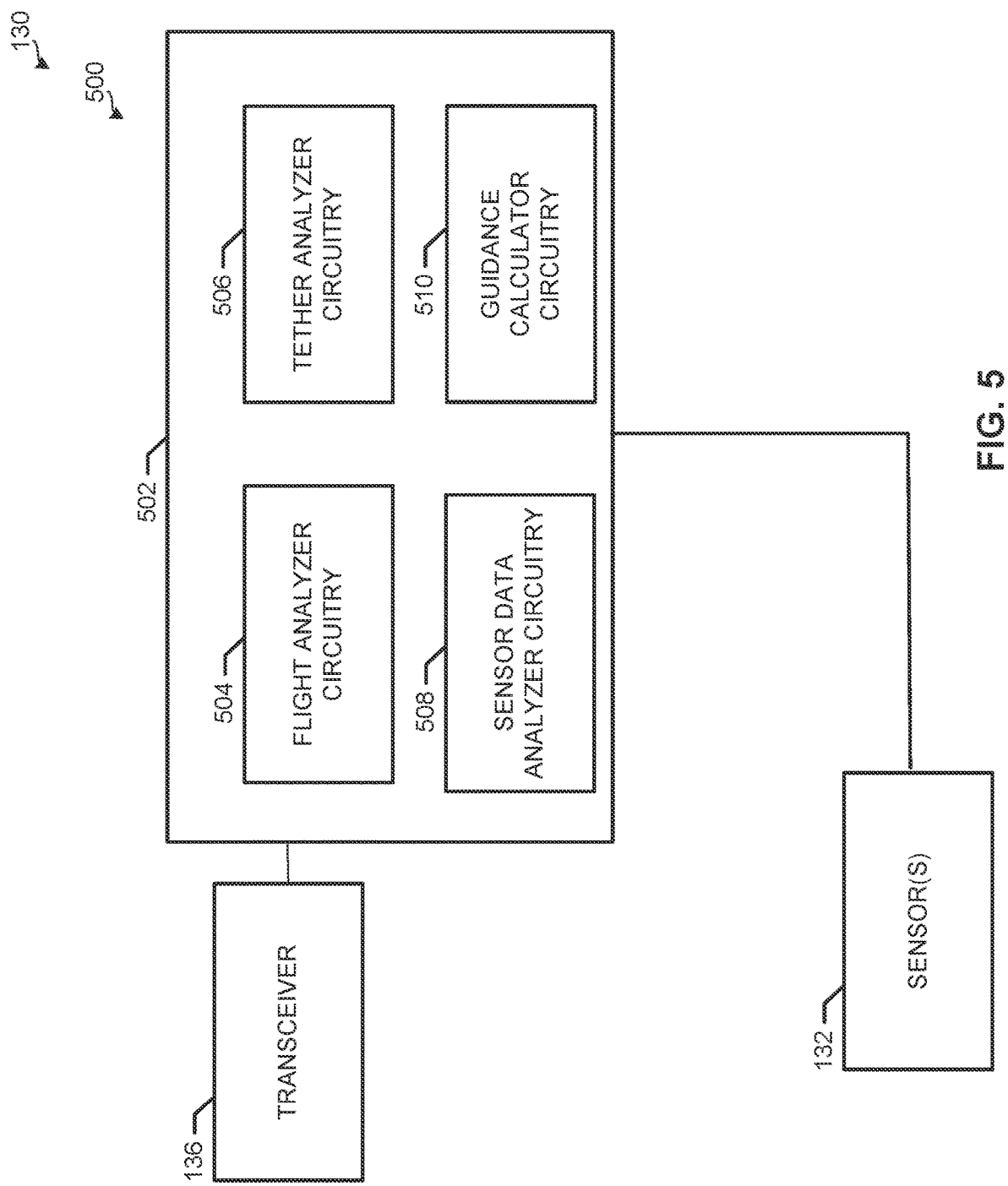
FIG. 5 is a schematic overview of an example aircraft guidance analyzer system that can be implemented in examples disclosed herein.

FIG. 5 is a schematic overview of an example aircraft guidance analyzer system 500 that can be implemented in the guidance controller 127 of the UAV 120, the movement analyzer 134 and/or the guidance apparatus 130 of FIG. 1. The example aircraft guidance analyzer system 500 includes a flight director 502 which, in turn, includes flight analyzer circuitry 504, tether analyzer circuitry 506, sensor data analyzer circuitry 508 and guidance calculator circuitry 510. In this example, the flight director 502 is communicatively coupled to the sensor 132, which is implemented as an optical sensor (e.g., a camera) to detect a movement and/or a position of the UAV 120. However, any appropriate sensor type can be implemented instead.

The example sensor data analyzer circuitry 508 is implemented to direct the sensor 132 to output signals and determine and/or process sensor data and/or parameters (e.g., flight parameters, etc.) of the UAV 120. In some examples, the sensor data analyzer circuitry 508 can determine a position and/or a course of the UAV 120 based on the output signals from the sensor 132.

According to the illustrated example, the flight analyzer circuitry 504 analyzes positional and/or movement data of the UAV 120. In this example, the flight analyzer circuitry 504 determines a position (e.g., a relative position, an absolute position, a spatial coordinate in a global coordinate system) and/or a course of the UAV 120 based on the aforementioned signals from the sensor 132. In some examples, the flight analyzer circuitry 504 calculates a relative position of the UAV 120 relative to at least a portion of the tether line 108 based on the measured position of the UAV 120 in conjunction with a known or presumed position of at least a portion of the tether line 108. Additionally or alternatively, the relative position of the UAV 120 to the tether line 108 is calculated by the flight analyzer circuitry 504 based on a measured position of the at least the portion of the tether line 108 (e.g., via at least one of the sensors 132).

The guidance calculator circuitry 510 of the illustrated example calculates an adjustment and/or direction to move the UAV 120 to engage the tether line 108 for recovery of the UAV 120 or the payload 224 carried by the UAV 120. In this example, the guidance calculator circuitry 510 determines an adjustment of a course and/or speed of the UAV 120 based on the determined position of the UAV 120 relative to the tether line 108 (e.g., based on a known or presumed position of the tether line 108). Additionally or alternatively, a position of at least a portion of the tether line 108 (e.g., a portion of the tether line 108 predicted to contact or engage the UAV 120) determined by the tether analyzer circuitry 506 is utilized by the guidance calculator circuitry 510.

In some examples, the tether analyzer circuitry 506 is implemented. The example tether analyzer circuitry 506 can calculate and/or determine positions of at least a portion of the tether line 108. For example, a geometric calculation of position(s) of at least a portion of the tether line 108 can be determined based on sensor measurements from the sensor 132. Additionally or alternatively, the example tether analyzer circuitry 506 determines positions of multiple segments of the tether line 108. In some examples, a 3-D spatial representation of the tether line 108 is generated. Additionally or alternatively, the tether analyzer circuitry 506 takes into account properties of the tether line 108, such as, but not limited to, geometric properties of the tether line 108, elastic properties of the tether line 108, a marker configuration and/or an arrangement of the tether line 108, etc.

While an example manner of implementing the aircraft guidance analyzer system 500 of FIG. 5 is illustrated in FIG. 5, one or more of the elements, processes, and/or devices illustrated in FIG. 5 may be combined, divided, re-arranged, omitted, eliminated, and/or implemented in any other way. Further, the example flight analyzer circuitry 504, the example tether analyzer circuitry 506, the example sensor data analyzer circuitry 508, the example guidance calculator circuitry 510, and/or, more generally, the example aircraft guidance analyzer system 500 of FIG. 5, may be implemented by hardware, software, firmware, and/or any combination of hardware, software, and/or firmware. Thus, for example, any of the example flight analyzer circuitry 504, the example tether analyzer circuitry 506, the example sensor data analyzer circuitry 508, the example guidance calculator circuitry 510, and/or, more generally, the example aircraft guidance analyzer system, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example flight analyzer circuitry 504, the example tether analyzer circuitry 506, the example sensor data analyzer circuitry 508, and/or the example guidance calculator circuitry 510, is/are hereby expressly defined to include a non-transitory computer readable storage device or storage disk such as a memory, a digital versatile disk (DVD), a compact disk (CD), a Blu-ray disk, etc., including the software and/or firmware. Further still, the example aircraft guidance analyzer system 500 of FIG. 5 may include one or more elements, processes, and/or devices in addition to, or instead of, those illustrated in FIG. 5, and/or may include more than one of any or all of the illustrated elements, processes and devices.

Figure 6:
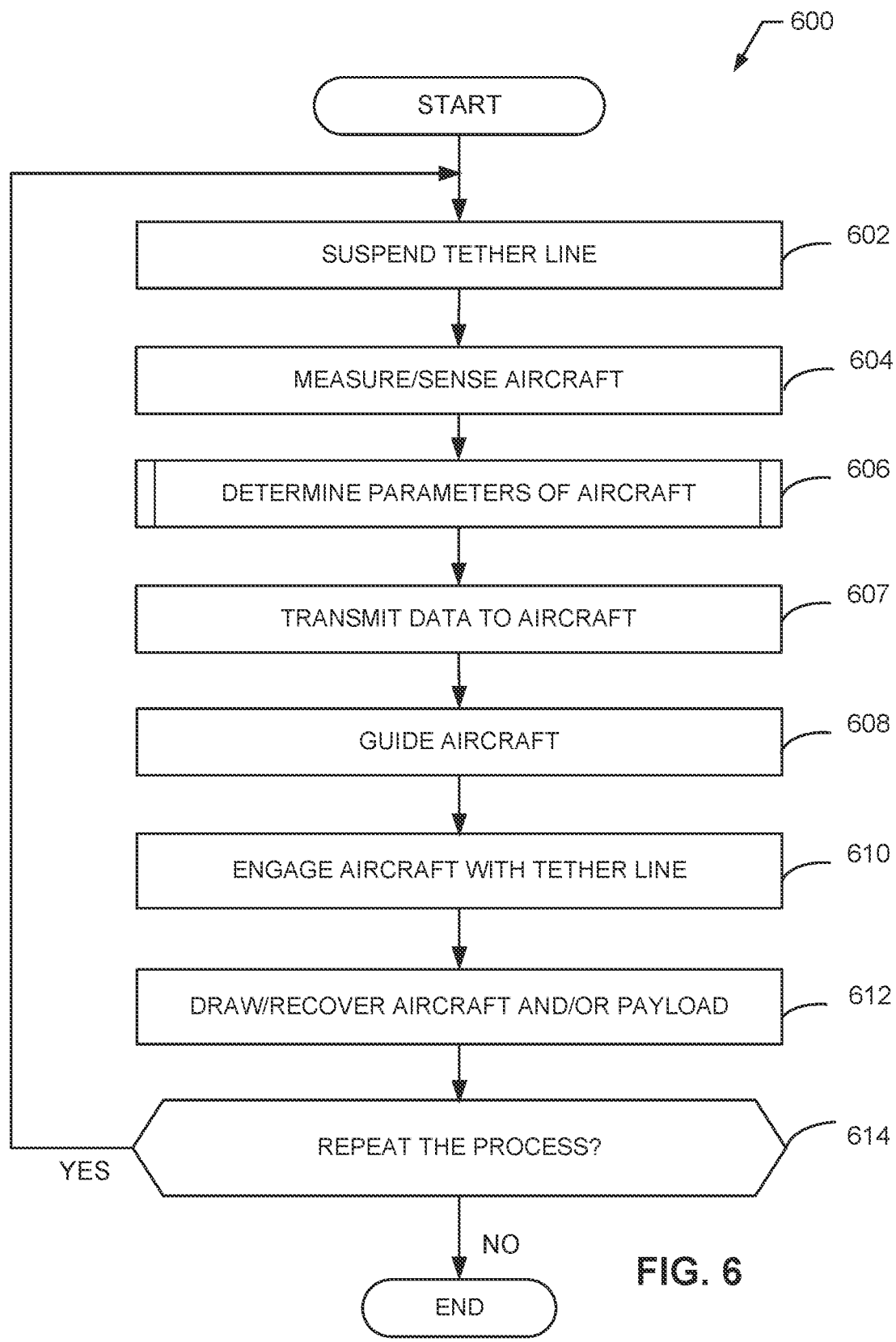
FIG. 6 is a flowchart representative of example machine readable instructions that may be executed by example processor circuitry to implement the example UAV recovery system of FIG. 1, the example UAV recovery system of FIG. 2 and/or the example aircraft guidance analyzer system of FIG. 5.
Figure 7:
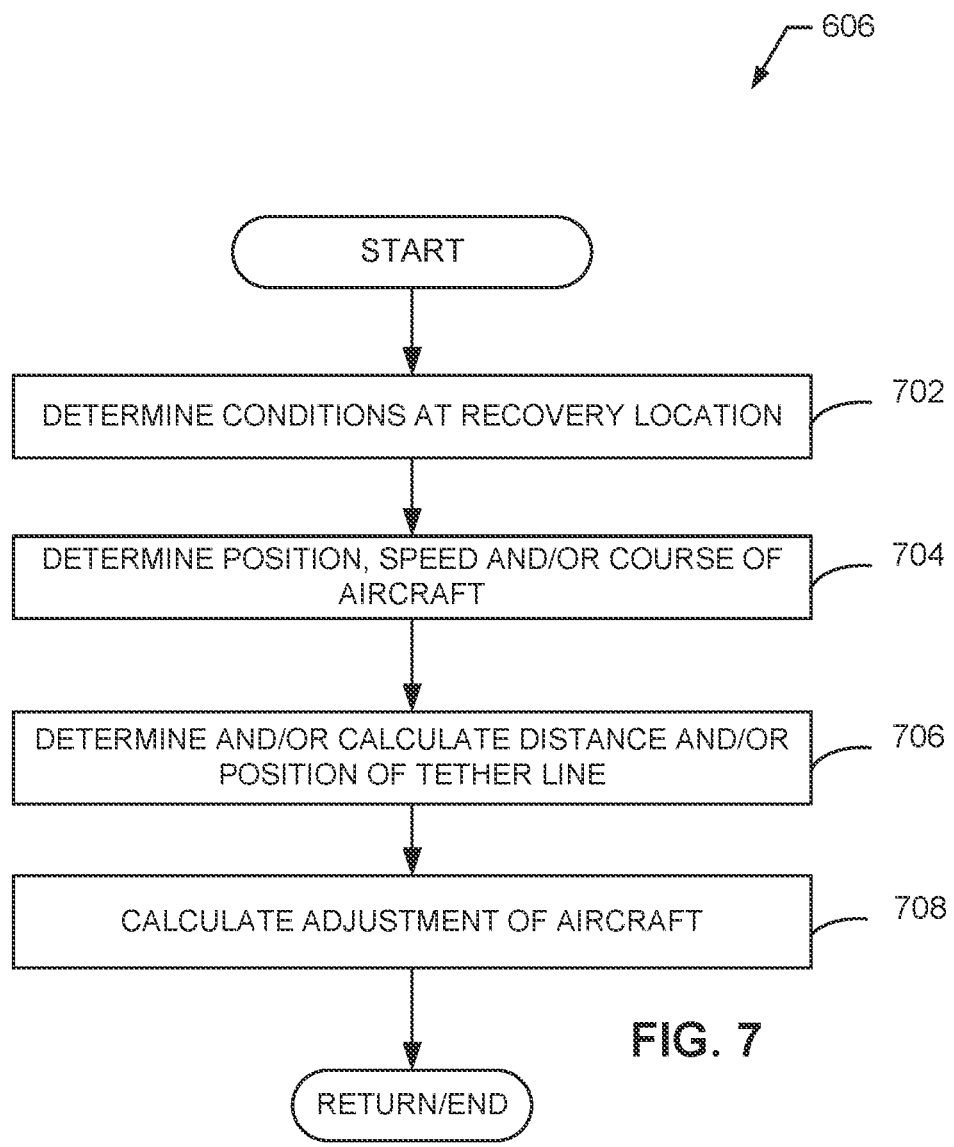
FIG. 7 is a flowchart representative of an example subroutine of the machine readable instructions of FIG. 6.

Flowcharts representative of example hardware logic circuitry, machine readable instructions, hardware implemented state machines, and/or any combination thereof for implementing the aircraft guidance analyzer system 500 of FIG. 5 are shown in FIGS. 6 and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and 7, many other methods of implementing the example aircraft guidance analyzer system 500 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A. (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to guide an aircraft, such as the example UAV 120, to the tether line 108 for recovery of the UAV 120. The machine readable instructions and/or operations 600 of FIG. 6 begins as the aircraft is to be guided based on signals received from the guidance apparatus 130. In other examples, the aircraft is guided toward the tether line 108 for recovery of the payload 224 carried by the aircraft.

At block 602, the tether line 108 is suspended. In the illustrated example, the tether line 108 is suspended generally vertically with respect to Earth. In some examples, a tension of the tether line 108 is maintained by the tensioner 111 to facilitate stability of the tether line 108 and/or recovery of the aircraft.

At block 604, the sensor data analyzer circuitry 508 of the illustrated example directs the sensor 132 to measure and/or sense parameters associated with the aircraft. In particular, the sensor 132 is caused to output signals pertaining to a position and/or movement of the aircraft.

In some examples, at block 606, as will be discussed in greater detail below in connection with FIG. 7, the flight analyzer circuitry 504 and/or the sensor data analyzer circuitry 508 determines parameters of the aircraft based on the output signals of the sensor 132. In the illustrated example, the flight analyzer circuitry 504 and/or the sensor data analyzer circuitry 508 determines a position (e.g., a relative position, an absolute position, etc.) and a course of the aircraft. Additionally or alternatively, the flight analyzer circuitry 504 and/or the sensor data analyzer circuitry 508 determines a speed of the aircraft. In some examples, triangulation, object tracking output, etc. are implemented.

At block 607, data corresponding to the sensor output of the sensor 132 is transmitted to the aircraft. In some examples, the data includes the position and/or the course of the aircraft. Additionally or alternatively, the data includes guidance and/or guidance adjustment information to instruct the aircraft to adjust its course. In some examples, the data includes At block 608 the aircraft is guided toward the tether line 108 based on the aforementioned data transmitted to the aircraft. In some examples, the aircraft is guided based on sensor output from the sensor 132 in substantially real time.

At block 610, the aircraft is caused to engage the tether line 108. In this example, at least a portion of the aircraft contacts and is captured by the tether line 108. In some examples, the aircraft is controlled to impact the tether line 108 at a defined speed range. In some other examples, the aircraft engages the tether line 108 by causing the payload 224 to contact the tether line 108.

At block 612, the aircraft and/or the payload 224 is drawn and/or recovered via the tether line 108. In this example, the aircraft is drawn toward the vessel 101 for recovery of the aircraft. In other examples, the aircraft is drawn toward a stationary ground-based structure on land.

At block 614, it is determined whether to repeat the process. If the process is to be repeated (block 614), control of the process returns to block 602. Otherwise, the process ends. This determination may be based on whether additional aircraft are to be recovered.

Turning to FIG. 7, the example subroutine 606 begins as movement and/or positional information of the aircraft is analyzed based on sensor data from the sensor 132. In this example, the aircraft is being guided to impact the tether line 108 for recovery thereof. The subroutine 606 may be performed by the aircraft guidance apparatus 130, the movement analyzer 134 and/or the guidance controller 127 of the aircraft.

At block 702, in some examples, the flight analyzer circuitry 504 and/or the sensor data analyzer circuitry 508 determines conditions at or proximate a recovery site (e.g., the vessel 101). For example, the flight analyzer circuitry 504 and/or the sensor data analyzer circuitry 508 may determine wind conditions, weather conditions, wave conditions (e.g., near the vessel 101) via data from at least one of the sensors 132.

At block 704, the example flight analyzer circuitry 504 and/or the example guidance calculator circuitry 510 determines a position, speed and/or course of the aircraft. In some examples, positional changes of the aircraft over time are measured to characterize the movement of the aircraft.

At block 706, the tether analyzer circuitry 506 of the illustrated example determines and/or calculates a distance and/or position of the tether line 108 (e.g., a portion of the tether line 108 to contact the aircraft) relative to the aircraft based on the positions of the markers. Additionally or alternatively, the example tether analyzer circuitry 506 calculates an orientation and/or spatial representation of at least a portion of the tether line 108 (e.g., a portion of the tether line 108 between adjacent ones of the markers).

At block 708, the example guidance calculator circuitry 510 calculates an adjustment of movement of the aircraft to the tether line 108 and the process ends/returns. In particular, the adjusted movement of the aircraft (e.g., an adjusted course, speed and/or altitude of the aircraft) is determined based on the calculated position and/or distance of the tether line 108 determined by the example guidance calculator circuitry 510. In some examples, the guidance calculator circuitry 510 and/or the flight analyzer circuitry 504 controls the aircraft in substantially real time toward the tether line 108. In some such examples, sensor data from the sensor 132 is continuously and/or periodically analyzed as the aircraft moves closer to the tether line 108.

Figure 8:
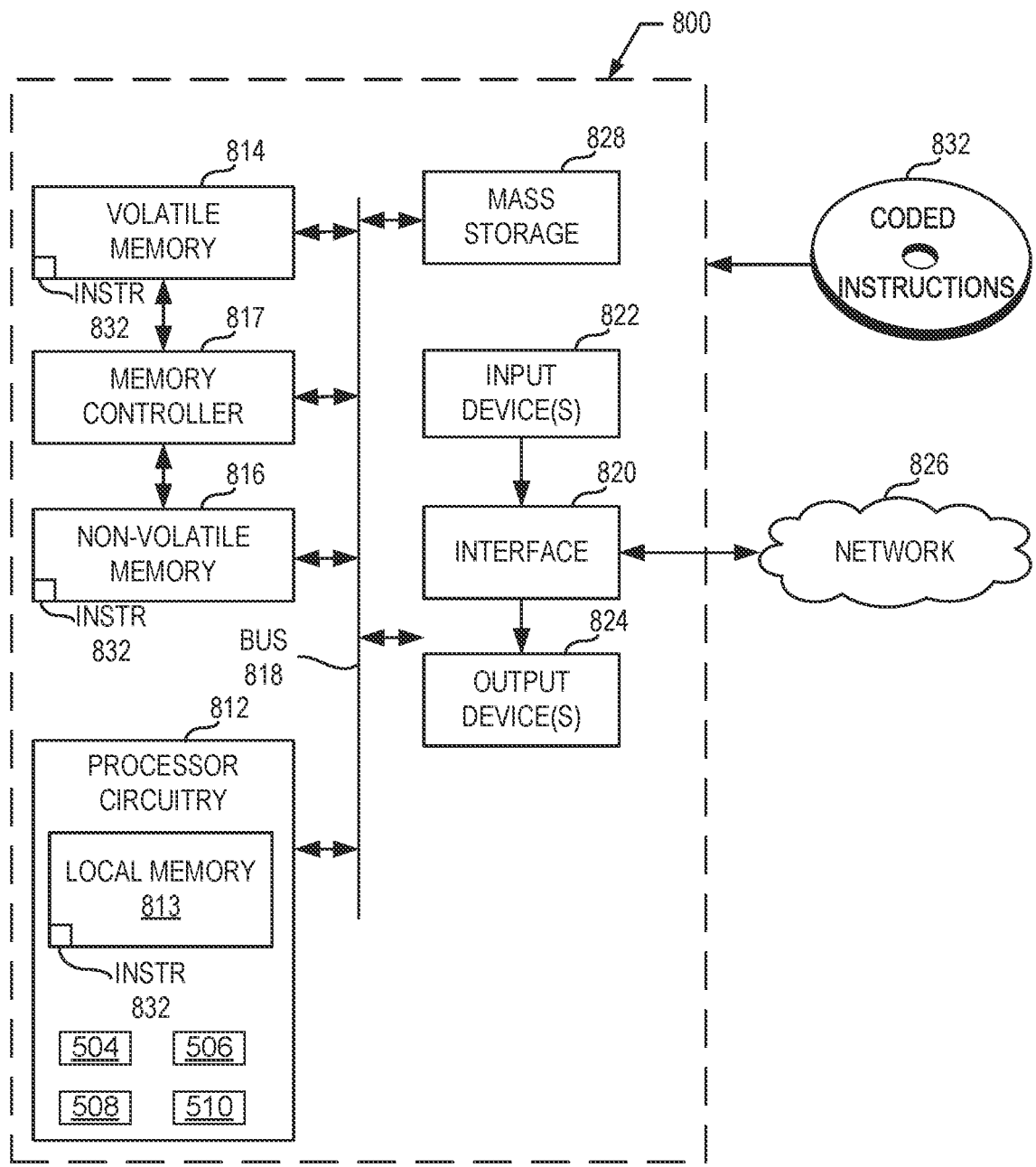
FIG. 8 is a block diagram of an example processing platform including processor circuitry structured to execute the example machine readable instructions of FIG. 3 to implement the example UAV recovery system of FIG. 1, the example UAV recovery system of FIG. 2 and/or the example aircraft guidance analyzer system of FIG. 5.

FIG. 8 is a block diagram of an example processor platform 800 structured to execute and/or instantiate the machine readable instructions and/or operations of FIGS. 6 and 7 to implement the aircraft guidance analyzer system 500 of FIG. 5. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example flight analyzer circuitry 504, the example tether analyzer circuitry 506, the example sensor data analyzer circuitry 508 and the example guidance calculator circuitry 510.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs. CDs, Blu-ray disk drives, redundant array of independent disks (RAID) systems, solid state storage devices such as flash memory devices, and DVD drives.

The machine executable instructions 832, which may be implemented by the machine readable instructions of FIGS. 6 and 7, may be stored in the mass storage device 828, in the volatile memory 814, in the non-volatile memory 816, and/or on a removable non-transitory computer readable storage medium such as a CD or DVD.

Figure 9:
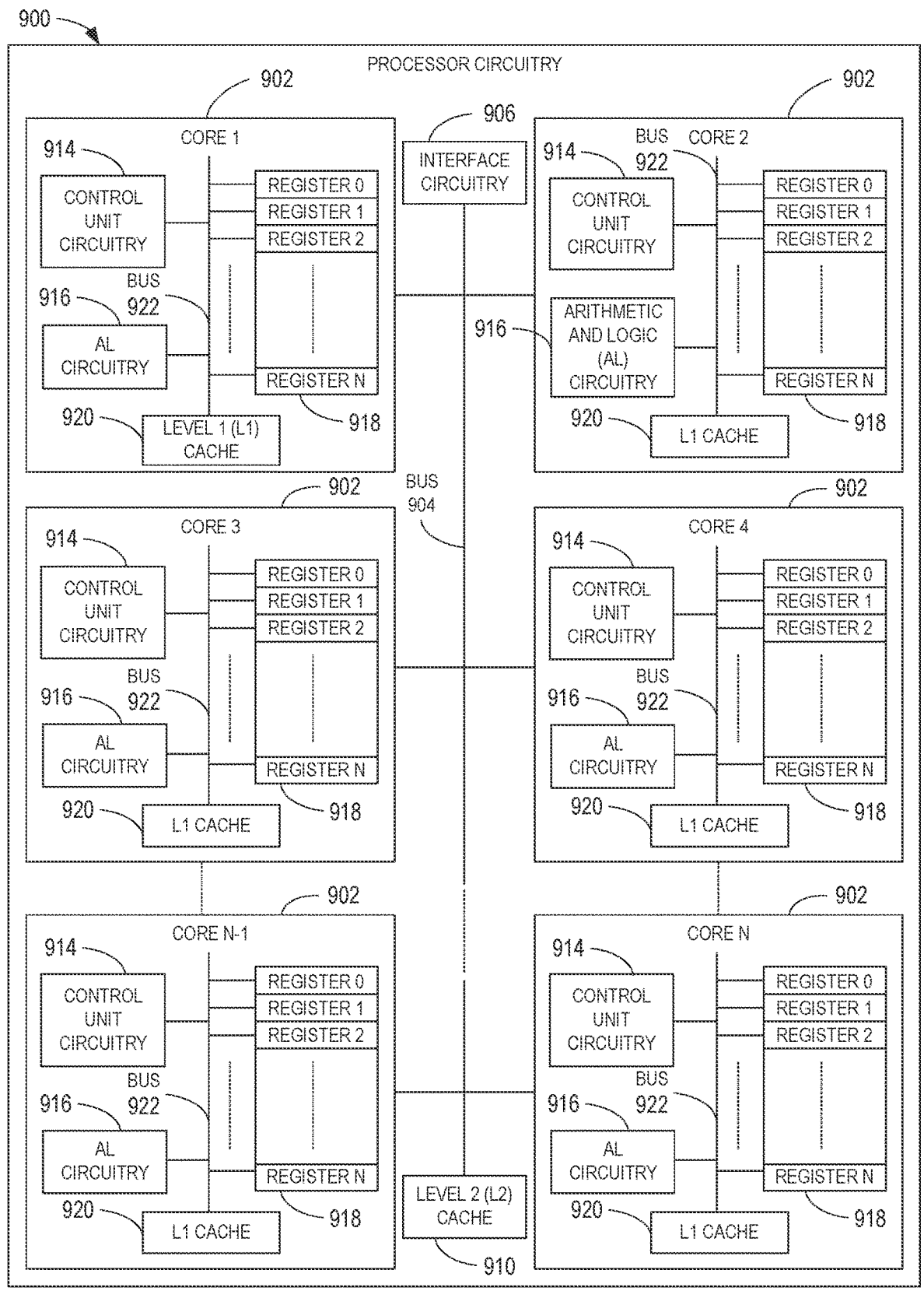
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU. DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
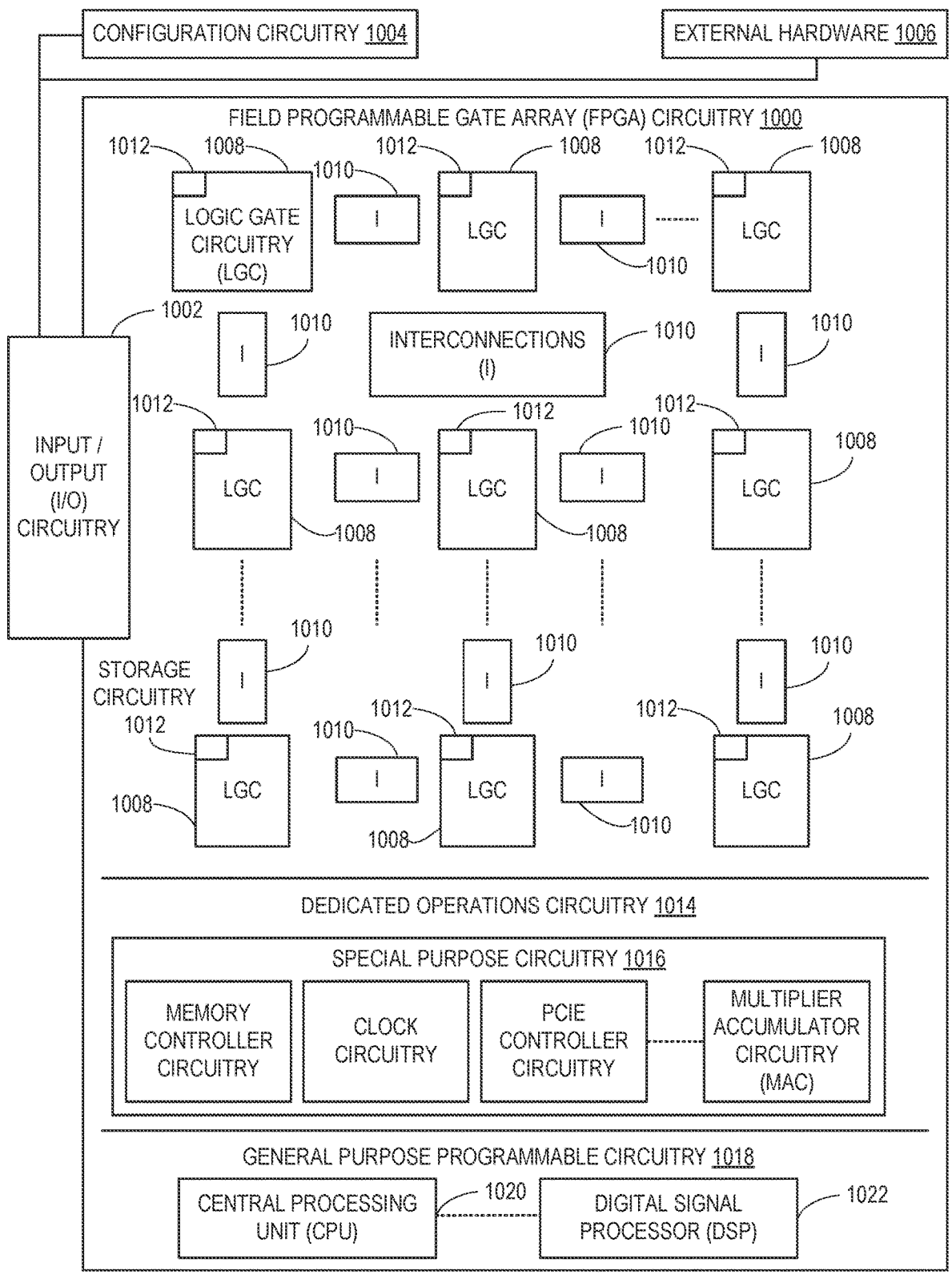
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 6 and 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 6 and 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and 7. As such, the FPGA circuitry 1000 may be structured to effectively instantiate some or all of the machine readable instructions of the flowcharts of FIGS. 6 and 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 6 and 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (A/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 6 and 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6 and 7 may be executed by one or more of the cores 902 of FIG. 9 and a second portion of the machine readable instructions represented by the flowcharts of FIGS. 6 and 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 900 of FIG. 9 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Further examples and combinations thereof include the following:

Example 1 includes an apparatus comprising a sensor on or proximate a tether line, the sensor to measure at least one parameter of an aircraft while the aircraft is in flight and provide sensor output corresponding to a position of the aircraft, and a transceiver to transmit data corresponding to the position to the aircraft to guide the aircraft to engage the tether line for recovery of the aircraft or a payload carried by the aircraft.

Example 2 includes the apparatus as defined in example 1, further including instructions, at least one memory stored in the apparatus, and at least one processor to execute the instructions to determine a course of the aircraft, and determine an adjustment of movement of the aircraft based on the course, the transmitted data including the adjustment.

Example 3 includes the apparatus as defined in example 2, wherein the at least one processor is to calculate a position of at least a portion of the tether line, the adjustment determined at least partially based on the position of the at least the portion of the tether line.

Example 4 includes the apparatus as defined in any of examples 1 to 3, wherein the sensor is a first sensor, and further including a second sensor to measure a position of at least a portion of the tether line, wherein the data includes the position of the at least the portion of the tether line.

Example 5 includes the apparatus as defined in any of examples 1 to 4, wherein the sensor is supported by the tether line.

Example 6 includes the apparatus as defined in any of examples 1 to 5, wherein the transceiver is to transmit a relative position of the aircraft to the tether line to the aircraft.

Example 7 includes the apparatus as defined in any of examples 1 to 6, wherein the transceiver is to transmit differential global positioning system (GPS) data to the aircraft.

Example 8 includes a method of guiding an aircraft, the method comprising measuring, via a sensor positioned at or proximate a tether line, a position of the aircraft while the aircraft is in flight, and transmitting, via a transceiver, data pertaining to the measured position to the aircraft to guide the aircraft to engage the tether line for recovery of the aircraft or a payload carried by the aircraft.

Example 9 includes the method as defined in example 8, further including calculating, by executing instructions with at least one processor, an adjustment to a course of the aircraft based on the position, and guiding, by executing instructions with the at least one processor, the aircraft to the tether line based on the adjustment to the course.

Example 10 includes the method as defined in example 9, wherein the sensor is a first sensor, and further including measuring, via a second sensor, a position of at least a portion of the tether line, wherein the calculating the adjustment is at least partially based on the position of the at least the portion of the tether line.

Example 11 includes the method as defined in any of examples 8 to 10, wherein the transceiver is to transmit guidance data to the aircraft.

Example 12 includes the method as defined in any of examples 8 to 11, wherein the transmitting the data includes transmitting differential global positioning system (GPS) data to the aircraft.

Example 13 includes the method as defined in any of examples 8 to 12, further including recovering the aircraft with a tension device in response to the aircraft contacting the tether line.

Example 14 includes a non-transitory computer readable medium comprising instructions, which when executed, cause at least one processor to calculate a position of an aircraft relative to a tether line or a device supporting the tether line based on sensor output from a sensor positioned at or proximate the tether line while the aircraft is in flight, calculate an adjustment of movement of the aircraft based on the calculated position, and guide the aircraft to engage the tether line by causing a transceiver to transmit data pertaining to the calculated adjustment to the aircraft.

Example 15 includes the non-transitory computer readable medium as defined in example 14, wherein the sensor is a first sensor, and wherein the instructions cause the at least one processor to calculate a position of at least a portion of the tether line based on sensor output from a second sensor.

Example 16 includes the non-transitory computer readable medium as defined in example 14, wherein the sensor is a first sensor, and wherein the instructions cause the at least one processor to calculate a spatial arrangement of at least a portion of the tether line based on sensor output from a second sensor.

Example 17 includes the non-transitory computer readable medium as defined in any of examples 14 to 16, wherein the instructions cause the at least one processor to cause the transceiver to transmit guidance data to the aircraft.

Example 18 includes the non-transitory computer readable medium as defined in any of examples 14 to 17, wherein the instructions cause the at least one processor to calculate an adjustment of a speed of the aircraft.

Example 19 includes the non-transitory computer readable medium as defined in any of examples 14 to 18, wherein the instructions cause the at least one processor to determine an environmental condition proximate the tether line based on sensor data.

Example 20 includes the non-transitory computer readable medium as defined in example 19, wherein the adjustment of the movement is calculated at least partially based on the environmental condition.

Example 21 includes a system comprising a tether line, the tether line to be suspended for recovery of an aircraft, a sensor having a sight line to an area proximate the tether line, the sensor to detect the aircraft and output signals corresponding to a position of the aircraft, and a transceiver to transmit data pertaining to the position of the aircraft to the aircraft for guidance of the aircraft so that the aircraft engages the tether line.

Example 22 includes the system as defined in example 21, wherein the aircraft is a first aircraft, and further including a second aircraft to carry the sensor and the transceiver.

Example 23 includes the system as defined in example 22, wherein the second aircraft includes an unmanned aerial vehicle.

From the foregoing, it will be appreciated that example systems, methods, apparatus, and articles of manufacture have been disclosed that enable accurate and time-saving recovery of aircraft. Examples disclosed herein can enable recovery of aircraft in a variety of scenarios including movement of a recovery vessel, windy conditions, unpredictable movement of a tether line, etc.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure. While examples disclosed herein are shown in the context of recovering aircraft, examples disclosed herein can be applied to any appropriate type of manned or unmanned vehicle.

What is claimed is:

1. An apparatus comprising:
a first sensor positioned between opposing ends of a tether line, the first sensor to measure at least one parameter of an aircraft while the aircraft is in flight and provide first sensor output corresponding to a position of the aircraft;
a second sensor to provide second sensor output corresponding to measured segment positions of respective segments of the tether line, the segments extending between the opposing ends of the tether line and defining a 3-D spatial arrangement of the tether line; and
a transceiver to transmit data corresponding to the position of the aircraft and the measured segment positions to the aircraft to guide the aircraft to engage the tether line for recovery of the aircraft or a payload carried by the aircraft; and instructions;
at least one memory; and
at least one processor to execute the instructions to:
determine a course of the aircraft,
determine a sway of the tether line based on the segment positions; and
determine an adjustment of movement of the aircraft based on the course and the sway, the transmitted data including the adjustment.

2. The apparatus as defined in claim 1, wherein the first sensor is supported between opposing ends of a suspended portion of the tether line.

3. The apparatus as defined in claim 1, wherein the transceiver is to transmit a relative position of the aircraft to the tether line to the aircraft.

4. The apparatus as defined in claim 1, wherein the transceiver is to transmit differential global positioning system (GPS) data to the aircraft.

5. A method of guiding an aircraft, the method comprising:
measuring, via a first sensor positioned-between opposing ends of a tether line, a course of the aircraft while the aircraft is in flight;
measuring, via a second sensor, measured segment positions of respective segments of the tether line, the segments extending between the opposing ends of the tether line and defining a 3-D spatial arrangement of the tether line;
determining a sway of the tether line based on the measured segment positions; and
transmitting, via a transceiver, data pertaining to the course of the aircraft and the sway to the aircraft to guide the aircraft to engage the tether line for recovery of the aircraft or a payload carried by the aircraft.

6. The method as defined in claim 5, wherein the transceiver is to transmit guidance data to the aircraft.

7. The method as defined in claim 5, wherein transmitting the data includes transmitting differential global positioning system (GPS) data to the aircraft.

8. The method as defined in claim 5, further including recovering the aircraft with a tension device in response to the aircraft contacting the tether line.

9. A non-transitory computer readable medium comprising instructions, which when executed, cause at least one processor to:
calculate a course of an aircraft relative to a tether line or a device supporting the tether line based on first sensor output from a first sensor positioned between opposing ends of the tether line while the aircraft is in flight;
calculate measured segment positions of respective segments of the tether line based on second sensor output from a second sensor, the segments extending between the opposing ends of the tether line and defining a 3-D spatial arrangement of the tether line;
determine a sway of the tether line based on the measured segment positions;
calculate an adjustment of movement of the aircraft based on the course of the aircraft and the determined sway of the tether line; and
guide the aircraft to engage the tether line by causing a transceiver to transmit data pertaining to the calculated adjustment to the aircraft.

10. The non-transitory computer readable medium as defined in claim 9, wherein the instructions cause the at least one processor to cause the transceiver to transmit guidance data to the aircraft.

11. The non-transitory computer readable medium as defined in claim 9, wherein the instructions cause the at least one processor to calculate an adjustment of a speed of the aircraft.

12. The non-transitory computer readable medium as defined in claim 9, wherein the instructions cause the at least one processor to determine an environmental condition proximate the tether line based on sensor data.

13. The non-transitory computer readable medium as defined in claim 12, wherein the adjustment of the movement is calculated at least partially based on the environmental condition.

14. A system comprising:
- a tether line, the tether line to be suspended for recovery of an aircraft;
- a first sensor positioned at an intermediate length of the tether line, the first sensor to detect the aircraft and output first signals corresponding to a course of the aircraft;
- a second sensor to output second signals corresponding to measured segment positions of respective segments of the tether line, the segments defining a 3-D spatial arrangement of the tether line, the segments extending between opposing ends of the tether line;
- programmable circuitry to execute machine-readable instructions to determine a sway of the tether line based on the measured segment positions; and
- a transceiver to transmit data pertaining to the course of the aircraft and the the sway to the aircraft for guidance of the aircraft so that the aircraft engages the tether line.

15. The system as defined in claim 14, wherein the aircraft is a first aircraft, and further including a second aircraft to carry the first sensor and the transceiver.

16. The system as defined in claim 15, wherein the second aircraft includes an unmanned aerial vehicle.

17. The apparatus as defined in claim 1, wherein the at least one processor is to calculate the 3-D spatial arrangement of the tether line.

18. The non-transitory computer readable medium as defined in claim 9, wherein the instructions cause the at least one processor to generate a 3-D model of the tether line based on the segment positions.

19. The non-transitory computer readable medium as defined in claim 18, wherein the instructions cause the at least one processor to determine an offset of the 3-D model with respect to the aircraft to calculate the adjustment of the movement of the aircraft.

20. The apparatus as defined in claim 1, wherein the sway corresponds to a periodic motion of the tether line.

21. The apparatus as defined in claim 1, wherein the at least one processor is to determine a curvature of the tether line, and wherein the adjustment is further based on the curvature.

22. The apparatus as defined in claim 1, wherein the adjustment is further based on wind conditions at or proximate the tether line.

* * * * *

UNITED STATES PATENT AND TRADEMARK OFFICE
CERTIFICATE OF CORRECTION

| | | |
|---|---|---|
| PATENT NO. | : 12,077,293 B2 | Page 1 of 1 |
| APPLICATION NO. | : 17/477251 | |
| DATED | : September 3, 2024 | |
| INVENTOR(S) | : Rysdyk et al. | |

It is certified that error appears in the above-identified patent and that said Letters Patent is hereby corrected as shown below:

In the Claims

In Column 23, Claim 14, Line 28, delete "the".

Signed and Sealed this
Nineteenth Day of November, 2024

Katherine Kelly Vidal
*Director of the United States Patent and Trademark Office*